United States Patent [19]

LLoyd et al.

[11] 4,273,482
[45] Jun. 16, 1981

[54] AUTOMATIC TOOL-MOVING MACHINE

[75] Inventors: William M. LLoyd, Hartley; Brian M. Lloyd, Higher Compton, both of England

[73] Assignee: Conti-Form Machine Tools Limited, Plymouth, England

[21] Appl. No.: 52,663

[22] Filed: Jun. 27, 1979

[30] Foreign Application Priority Data

Jul. 3, 1978 [GB] United Kingdom ............... 28609/78

[51] Int. Cl.³ ..................... B23Q 21/00; G05B 00/00
[52] U.S. Cl. .................................. 409/80; 318/571; 318/577; 318/592; 409/193; 409/208
[58] Field of Search .............. 409/194, 193, 236, 208, 409/212, 80; 318/577, 592, 593, 640, 37

[56] References Cited

U.S. PATENT DOCUMENTS

| | | | |
|---|---|---|---|
| 2,717,979 | 9/1955 | Gardiner | 318/593 X |
| 3,431,474 | 3/1969 | Van Ostrand | 318/592 |
| 3,566,239 | 2/1971 | Taniguchi | 318/593 |
| 3,774,098 | 11/1973 | Moss | 318/577 X |
| 3,860,862 | 1/1975 | Dell et al. | 318/577 X |
| 4,025,839 | 5/1977 | Maury | 318/592 X |
| 4,078,195 | 3/1978 | Mathias et al. | 318/571 |
| 4,118,660 | 10/1978 | Ohtsuki et al. | 318/571 |
| 4,164,693 | 8/1979 | Leenhouts | 318/571 |

FOREIGN PATENT DOCUMENTS

| | | | |
|---|---|---|---|
| 1438414 | 6/1976 | United Kingdom | 409/193 X |
| 1493094 | 11/1977 | United Kingdom | 318/571 X |
| 1508848 | 4/1978 | United Kingdom | 318/592 X |
| 399099 | 2/1974 | U.S.S.R. | 318/592 |

*Primary Examiner*—William R. Briggs
*Attorney, Agent, or Firm*—Cushman, Darby & Cushman

[57] ABSTRACT

An automatic machine for displacing a shaping tool, such as a router, over a work area includes a tool mounting assembly carried by support means such as an articulated arm. The arm is movable by first movement means relative to fixed structure of the machine over the whole work area, while the tool mounting assembly can be moved within a limited zone relative to the arm by second movement means. The movement of the tool mounting assembly (and thus of the tool) is directly measured relative to the machine fixed structure and compared with a required movement to generate an error signal. This signal is fed to the second movement means which endeavors to move the tool mounting assembly as required over the work area. In order to prevent the tool mounting assembly reaching the limits of its movement relative to the arm, the first movement means is connected in a servo loop arranged to monitor the movement of the mounting assembly relative to the arm, and to activate the first movement means to maintain the mounting assembly within the limits of its movement.

15 Claims, 8 Drawing Figures

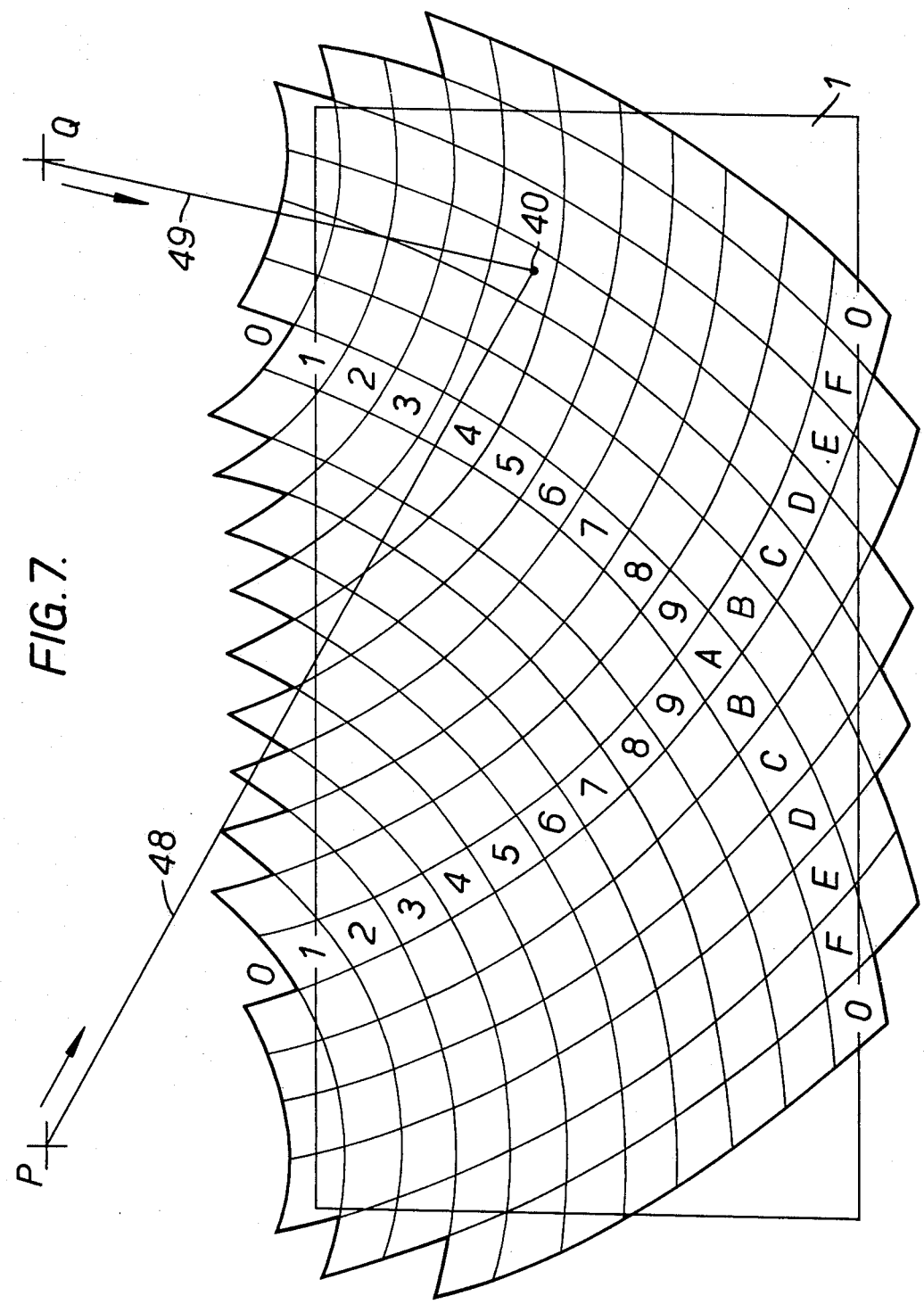

AUTOMATIC TOOL-MOVING MACHINE

BACKGROUND OF THE INVENTION (1) Field of the Invention

The present invention relates to automatic machines for displacing an element, such as a shaping tool, over a work area in a predetermined manner. In particular, but not exclusively, the invention concerns an automatic machine for controlling the movement of a shaping tool which, during operation on a workpiece, is subjected to substantial reaction forces in the plane of movement of the tool across the workpiece.

(2) Description of the Prior Art

The economic advantage of being able to automatically carry out predetermined operations on a workpiece is well appreciated.

Known automatic machines include robot manipulator arms carrying a tool at their free ends. These robot arms generally comprise a number of articulated limbs whose relative orientations are controlled by respective servo control systems in response to 'demand' signals read off a program tape. The actual sensing and displacement of the tool held at the free end of the arm is determined by a summation of the sensed relative positions of the limbs and a summation of their relative displacements. Such automatic machines are generally unsuitable for operations where substantial reaction forces are experienced since the inertia of the limbs and their flexions under the action of the reaction forces makes accurate absolute position sensing of the tool and its accurate movement very difficult. The use with certain robot arms of imaging systems to detect tool position does not solve the problem since image processing is slow and effectively introduces inertia into the servo control systems.

Other automatic shaping machines are known in which the effect of varying cutting reaction forces is compensated for by mounting the shaping tool on a massive carriage displaceable over the workpiece. This approach requires very large acceleration forces to be generated to achieve an adequate operating speed with the result that its mechanical implementation is large and complex.

British Pat. No. 1,438,414 (IBM) teaches an interesting approach to the problem of accurately moving a tool over a workpiece. In the system there described, coarse positioning is effected by moving the worktable carrying the workpiece while fine positioning is achieved by movement of the tool (an electron beam). Coarse and fine positioning are carried out in succession so that workpiece processing can only be carried out continuously over the small area accessible by fine position adjustment of the tool. Continuous operation over the range of workpiece locations achievable using the movable worktable is not possible.

The aforementioned automatic machines are generally numerically controlled, the desired movement path of the tool being defined by a succession of points with interpolation therebetween. The processing of the 'demand' and feedback data of the servo control systems of the machines requires a considerable data handling capability resulting in expensive computer control systems, especially to interpolate between the main points at high data rates.

It is an object of the present invention to provide an automatic machine for displacing an element over a work area which is capable of compensating for varying forces exerted on said element and yet can effect relatively accurate and rapid movement of the element. In particular, the invention seeks to provide an improved automatic shaping machine such as a milling or routing machine.

SUMMARY OF THE INVENTION

According to the invention, there is provided an automatic machine for moving an element over a work area in a predetermined manner, said machine comprising:

first support means carried by fixed structure of the machine for movement relative thereto over said work area, second support means mounting said element and carried by said first support means for limited movement relative thereto to move the said element over a limited zone of the work area, the location of said zone within the work area being dependent on the instantaneous position of the first support means, a first servo control loop including first movement means operable to move the first support means relative to the fixed structure to move the second support means and the said element over substantially the whole of the work area, and first control means for controlling operation of said first movement means, and a second servo control loop including second movement means for effecting said limited relative movement of the first and second support means, and second control means arranged to control said second movement means to endeavour to effect a required movement of said element over the work area, said first control means being responsive to relative movement of the first and second support means to so control the movement of the first support means that the second support means remains within the limits of its said limited movement relative to the first support means as the second movement means endeavours to effect the said required movement of the element over the work area.

By dividing the element support means into two structures, the second of which is only required to have a limited range of movement, the speed of response of the system can be increased since rapid movement of the element can be effected using the second movement means to move the second support means without initially requiring a movement of the necessarily more massive first support means. The first support means is moved at a slower rate of acceleration or deceleration to maintain the second support means within its operative range of movement. Such an arrangement results in required movements of the element being followed continuously by the faster acting second movement means and avoids the need to calculate a division of the required movement between the first and second movement means.

In one embodiment of the invention in which the said element is a shaping tool, the first support means takes the form of an articulated arm carrying the second support means at its free end. The mass of the second support means is made considerably less than that of the arm but is not reduced to an absolute minimum since its mass helps to reduce the amplitude of high frequency perturbations of the shaping tool caused by cutting reaction forces.

Preferably the movement of the element (shaping tool) is sensed relative to the fixed structure of the frame by sensing means of the second control unit which directly intercommunicate the fixed structure with a point moving with the shaping tool. Such sensing means can comprise two trace wires or light beams with associated encoders spaced apart on the machine fixed structure and arranged to output feedback signals indicative of the movement of the tool in the two coordinate directions defined by the wires or beams. These feedback signals are compared with demand signals representing the required tool movement to generate suitable controlling signals for controlling the second movement means. The demand signals are, for example, read off magnetic tape.

Preferably a third servo control loop is provided which includes sensor means directly sensing relative movement between the first and second support means to modify the control of the second movement means effected by the second control means. This direct sensing enables an even faster response to be achieved by the second movement means.

The second control means is preferably built around a microprocessor. However, in order to enable a sufficient speed of operation of the machine without exceeding the data rate of the microprocessor, the demand and feedback signals take the form of pulsed, frequency modulated signals, the degree of modulation being representative of the speed of movement of the element (shaping tool). Such a form of signal enables the retrieval of absolute displacement information by integrating the signal by counting the signal pulses. Furthermore, actual comparison of the feedback and demand signals can be done by using an up-down pulse counter upstream of the microprocessor whose task of deriving the required control function is thereby greatly simplified.

BRIEF DESCRIPTION OF THE DRAWINGS

An automatic routing machine embodying the invention will now be particularly described, by way of example, with reference to the accompanying diagrammatic drawings, in which:

FIG. 7 is a diagram illustrating the notional division of the worktable area of the automatic routing machine into zones for the purpose of resolving between measurement and driving coordinate axes.

DESCRIPTION OF THE PREFERRED EMBODIMENT

Figure 1:
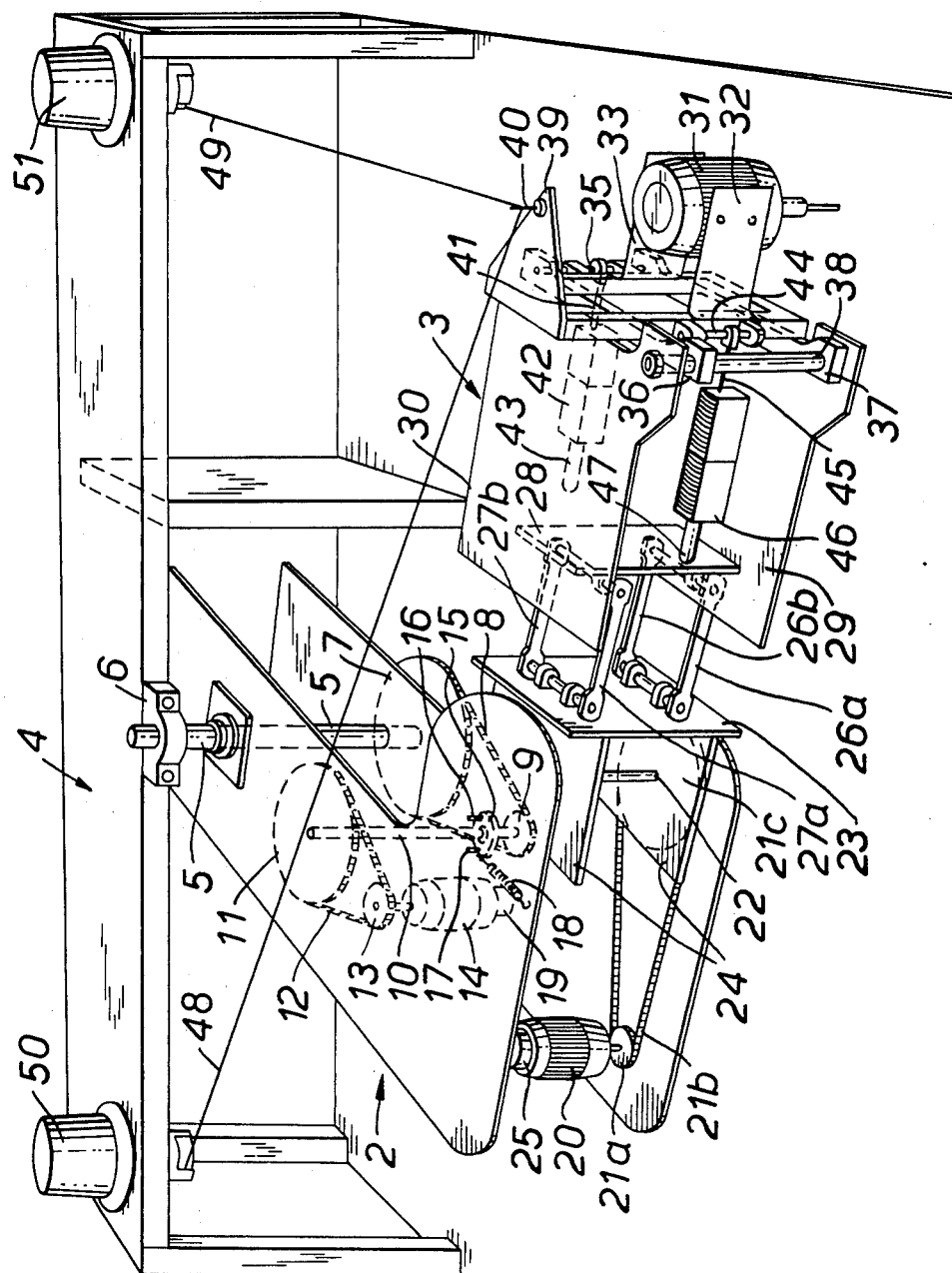
FIG. 1 is a perspective view of the routing machine.

As shown in FIG. 1, the automatic routing machine comprises a worktable 1 arranged to support a workpiece (not shown), and a robot arm carrying at its free end a tool mounting assembly supporting a router 31. The robot arm and the tool mounting assembly respectively constitute first and second support means for the router 31. The robot arm comprises an inner first part 2 and an outer second part 3, and is arranged to displace the router 31 over substantially the whole of the worktable 1.

For illustration purposes the first part 2 of the arm has been illustrated as two flat parallel L-shape plates although in a practical embodiment these would be joined by appropriate struts and enclosed by panels to form a box-section arm portion. Likewise, the second arm part 3 is illustrated as two flat parallel plates although in a practical embodiment it would constitute a box-section element as the first arm part 2.

The robot arm is carried on fixed structure of the machine by the pivoting of the inner first part 2 about a shaft 5 secured to the fixed structure 4 by clamping blocks 6.

The fixed shaft 5 extends vertically and carries a fixed chain wheel 7 around which passes a chain 8 in an endless loop which is also engaged by drive sprocket 9 located at one end of a drive shaft 10. The shaft 10 is driven via a chain and sprocket transmission comprising a chain wheel 11, a chain loop 12 and a drive sprocket 13, from the output shaft of a motor 14 housed rigidly within the first part 2 of the arm.

Tensioning of the chain 8 is achieved by the following arrangement. The drive shaft 10 linking the chain wheel 11 with the drive sprocket 9 is carried in a pivoted bearing 15 which is pivotally connected to the arm part 2 by a pivot 16 offset from the axis of the shaft 10. A lug 17 offset from the shaft 10 on the side remote from the pivot 16 is resiliently biased by a spring 18 which urges the bearing 15 to turn about the pivot 16 displacing the shaft 10 laterally of its axis and tensioning the chain 8.

Due to the fact that the motor 14 and its associated drive transmissions are connected to the first part 2 of the arm, and the chain wheel 7 is rigidly fixed in relation to the worktable 1, rotation of the drive motor 14 causes the first part 2 of the arm to turn about the axis of the shaft 5. This rotation is monitored by a tachometer 19 coupled to the output shaft of the motor 14.

A second motor 20, also mounted on the first part 2 of the arm drives a reduction transmission comprising a drive sprocket 21a, a chain 21b and a chain wheel 21c mounted on a shaft 22. The chain wheel 21c is rigid with a portion of the outer second arm part 3 constituted by a support plate 23 and two tongue plates 24. As a result, rotation of the second motor 20 is effective to cause rotation of the outer arm part 3 relative to the inner arm part. This rotation is monitored by a tachometer 25 coupled to the output shaft of the motor 20.

The reduction gearings associated with the inner arm motor 14 and the outer arm motor 20 are shown simplified for the sake of clarity although it will be appreciated that reduction by a greater ratio is generally required in practice than is illustrated, and this is achieved by means of a plurality of chain or belt transmissions interposed in a conventional manner between the motor output shafts and the chain wheels 7 and 21c.

The main portion of the second part of the arm is carried via a parallelogram linkage on the support plate 23 to enable vertical displacement of the router 31. This parallelogram linkage comprises two pairs of arms 26a, 26b and 27a, 27b pivotally connected between the support plate 23 and another upright plate 28 extending between two horizontal parallel plates 29, 30 which, as described above, are illustrated as the main structural members of the outer second part of the arm.

A drive mechanism is provided, similar to that associated with the outer arm motor 20, for controlling the vertical displacement of the outer part of the arm, this displacement being guided by the parallelogram linkage 26, 27.

Figure 2:
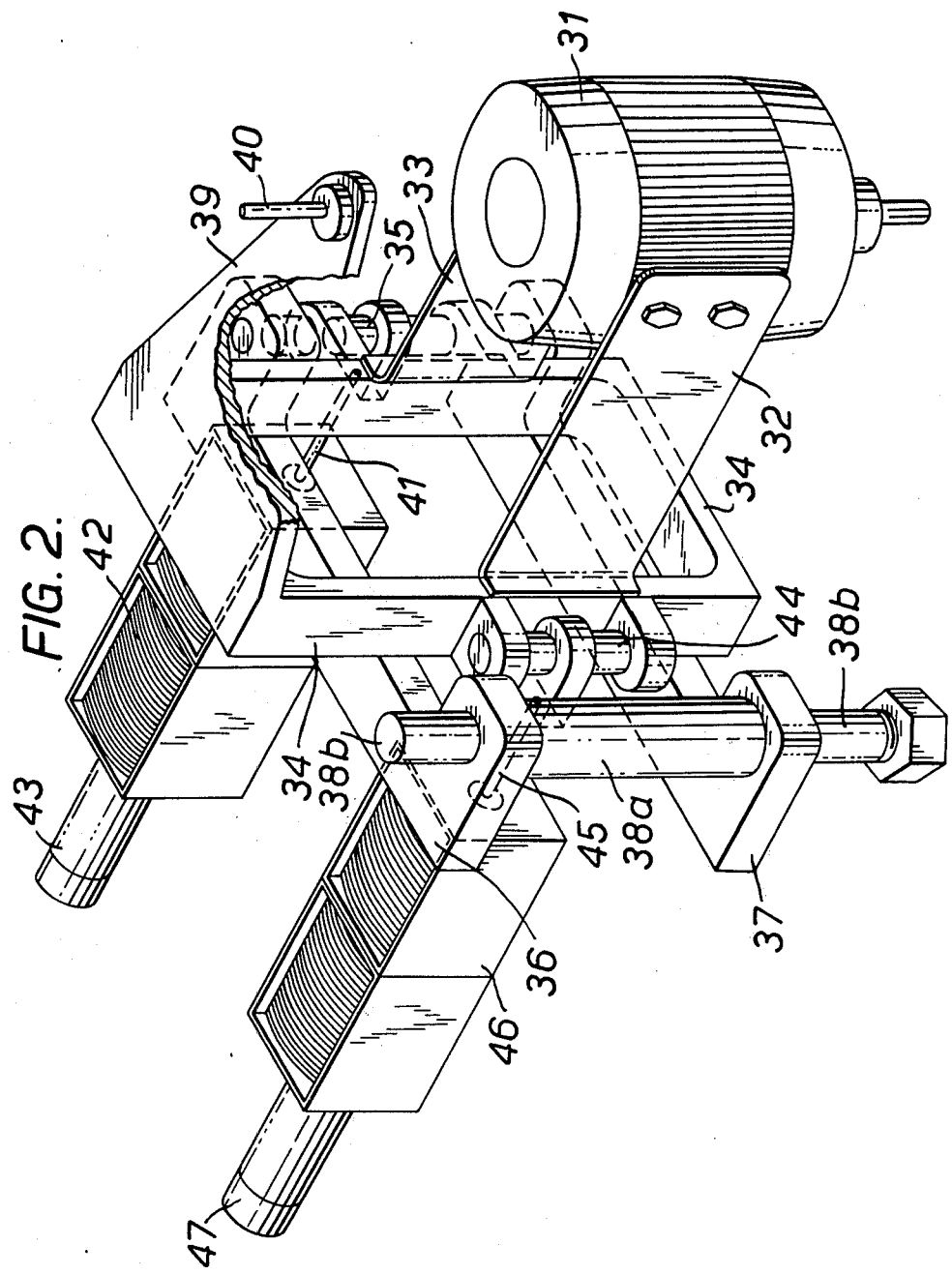
FIG. 2 is an enlarged perspective view of the machine head of the automatic routing machine.

As shown in FIGS. 1 and 2, the outer second part 3 of the arm carries the router 31 on a tool mounting assembly constituted by two parallel plates 32, 33 projecting forwardly from a rectangular frame 34 which is pivotally connected along one upright side, by a pivot 35 to a further rectangular frame constituted by two horizontal arms 36, 37 joined by two vertical arms one of which is constituted by the pivot pin 35 which joins the rectangular frame 34 to it, and the other of which is constituted by a torque tube 38a which rigidly connects the two arms 36, 37 and pivotally surrounds a pivot pin 38b rigidly connected to the plates 29, 30 which constitute the outer part of the arm.

The upper side of the smaller or inner rectangular frame 34 has a forwardly projecting flange 39 at the forward end of which is a mast 40 positioned coaxially with the axis of the router 31 carried in the brackets 32, 33.

To the pivot 35 is attached an operating rod or plunger 41 of a linear actuator constituted by a push-pull solenoid pair 42 to which is attached a linear variable differential transformer 43 for producing output signals representative of the movement of the operating rod 41.

On the opposite upright arm of the rectangular frame 34 are mounted two lugs carrying a further pivot pin 44 to which is connected, pivotally, the operating arm 45 of a further push-pull solenoid pair 46 which, likewise, has a linear variable differential transformer 47 mechanically connected thereto and operable to produce electrical signals representative of the movement of the operating rod 45 of the solenoid.

It will be appreciated that if the solenoid pair 46 moves the rod 45 whilst the rod 41 of the solenoid pair 42 remains stationary, the rectangular frame 34 will be caused to pivot about the pivot pin 35 so that the axis of the router 31, and likewise the mast 40 will perform a small arcuate movement centered on the axis of the pivot pin 35, which is approximately at 45° to the plane defined by the two pivot pins 35 and 44. Likewise, if the rod 45 of the solenoid pair 46 is maintained stationary while the rod 41 of the solenoid pair 42 is moved, the frame 34 will turn, with the two arms 36, 37, about the fixed pivot 38 (the frame 34 actually making a slightly different angular movement due to the lateral displacement of the pivots 38 and 44, but since this distance is small and since the displacement due to the energisation of the solenoid pair 42 will also be small, this difference is insignificant) and the router 31 and mast 40 will form a small arcuate displacement centered on a point somewhere between the axes of the two pivots 38 and 44, again being approximately 45° to the plane defined by the two pivot pins 35 and 44, and approximately perpendicular to the displacement effected by movement of the rod 45 of the solenoid pair 46 with the rod 41 stationary. The two axes of displacement of the router 31 corresponding to separate energisation of the solenoid pairs 42 and 46 are therefore approximately perpendicular to one another and displace at 45° to the line of action of the solenoids. These displacement axes will be referred to hereinafter as the A, B axes (see FIG. 3 which shows the various prime movers of the machine and their effective axes of action). Of course, it will be realised, that if both solenoid pairs 42, 46 are energised simultaneously to extend or retract the respective operating rods 41, 45, the router 31 will be displaced parallel to the line of action of the solenoids (direction 'A and B' in FIG. 3) whilst if the solenoids are energised oppositely so that one retracts whilst the other extends the displacement of the router 31 will be approximately perpendicular to the line of action of the solenoids (direction "A–B" in FIG. 3). This structure allows the fine movement of the router 31 to take place within a certain limited range of movement, which is detected by the sensors constituted by the linear variable differential transformers 43, 47 sensitive to the movement of the solenoid pairs 42, 46. These transformers will, for reasons of brevity, be referred hereinafter as LVDT sensors.

Figure 3:
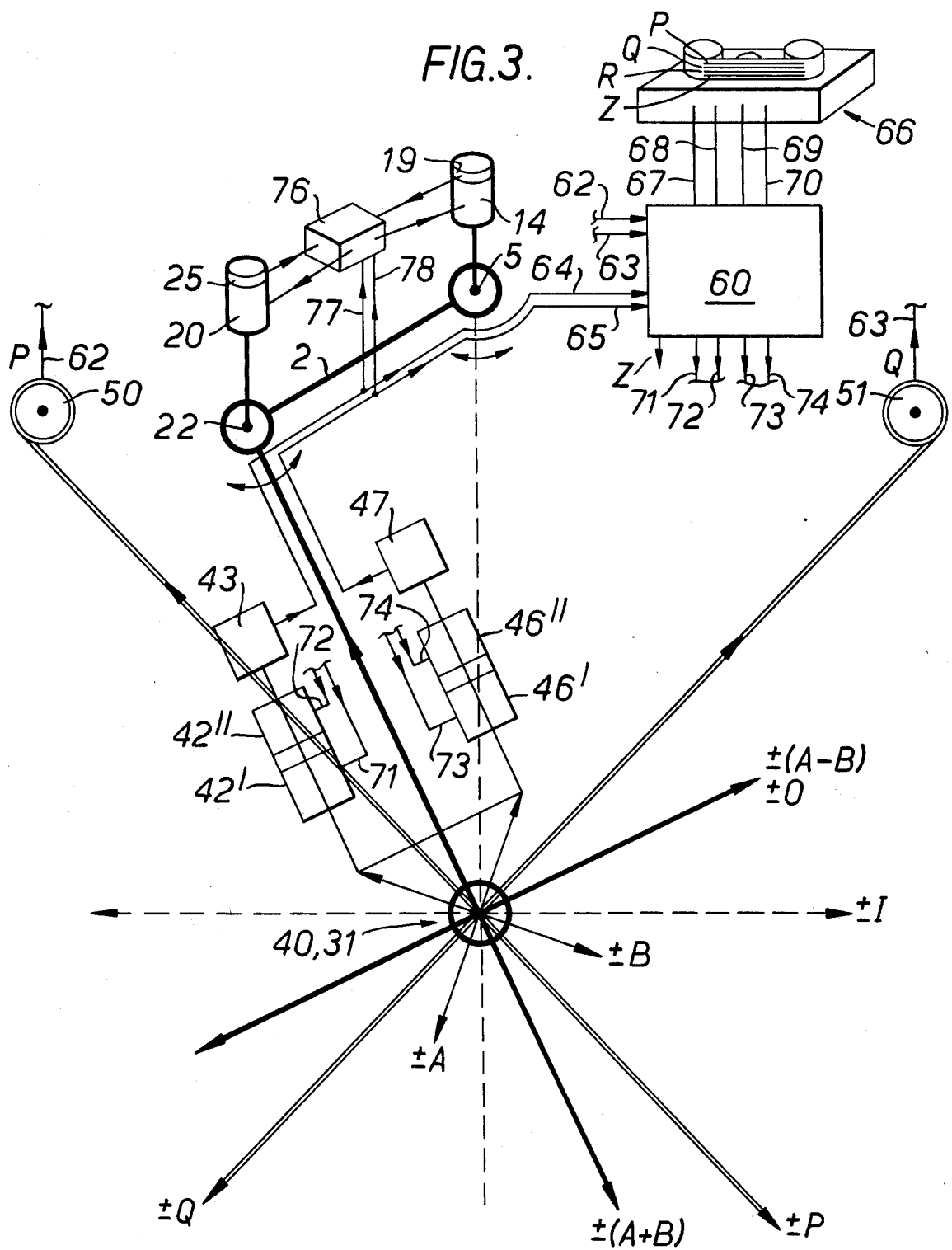
FIG. 3 is a schematic diagram illustrating the main components of a control system of the automatic routing machine and their associated axes of action and measurement.

In FIG. 3, the effective axes of action of the inner and outer arm motors 14 and 20 are referenced 'I' and 'O' respectively; as can be seen, the outer arm motor 20 causes displacement of the mast 40 and router 31 along an axis O coincident with the axis 'A–B' whereas the inner arm motor 14 causes displacement along an axis I whose orientation relative to the A,B axes depends on the relative orientation of the arm parts 2 and 3.

Figure 5A:
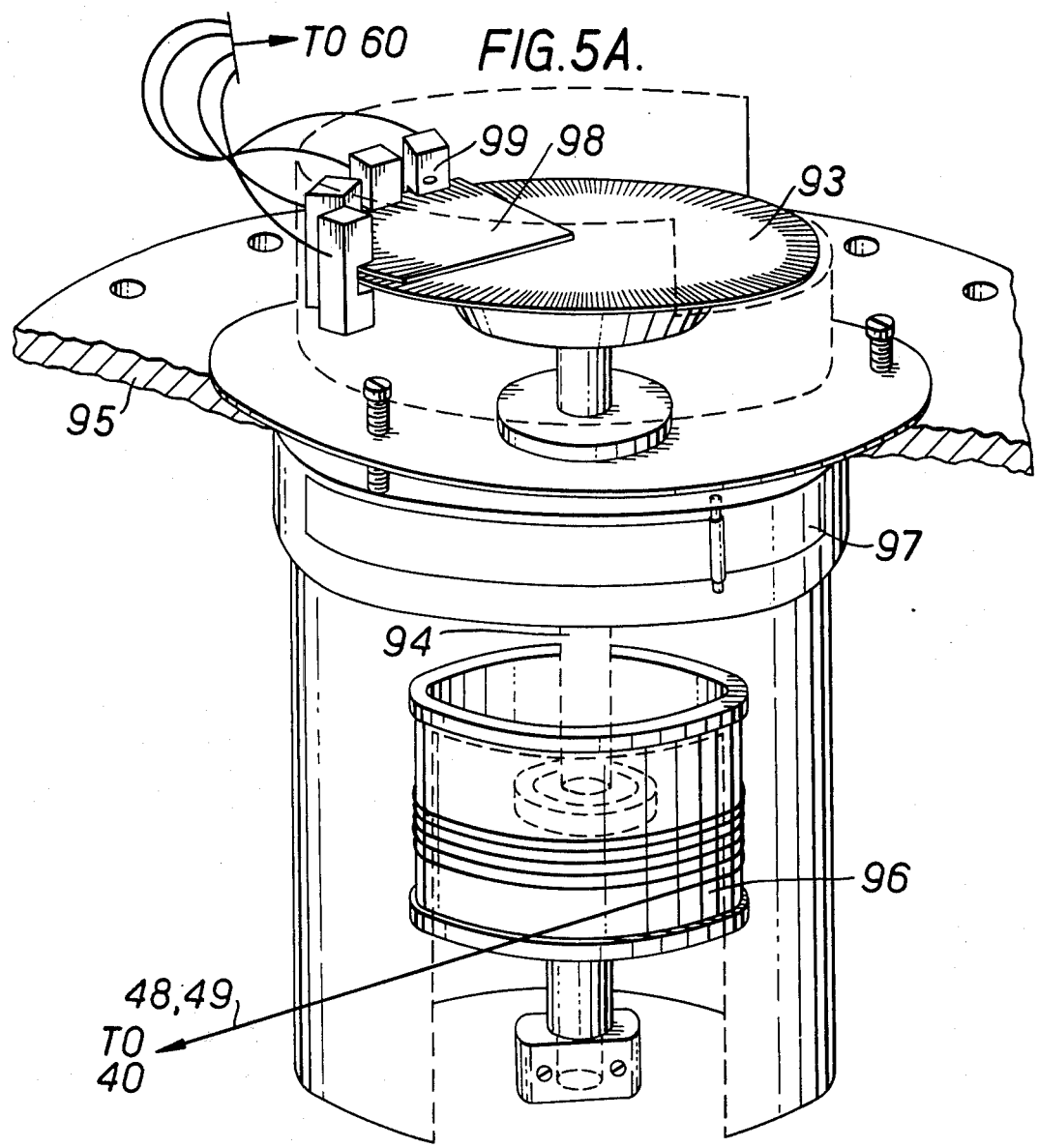
FIG. 5A is a schematic perspective view of an optical encoder of the control system.
Figure 5B:
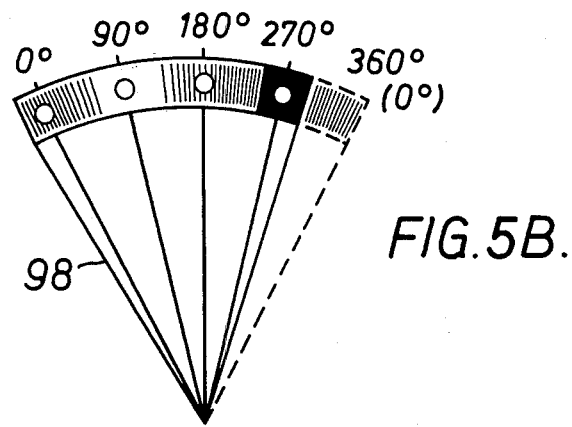
FIG. 5B is an enlarged plan view of a component of the optical encoder shown in FIG. 5A.

The mast 40 is connected by trace wires 48, 49 to respective optical encoders 50, 51 the construction and operation of which will be discussed in greater detail below in relation to FIG. 5. The optical encoders provide electrical pulse signals in dependence on the extension or retraction of the trace wires 48, 49 and these signals represent the displacement of the mast 40 relative to the fixed structure 4 of the machine with reference to measurement coordinate axes defined by the trace wires 48, 49. These coordinate axes defined by the wires 48, 49 will hereinafter be termed the P and Q axes respectively (see FIG. 3) and the signals associated with the associated encoders 50 and 51 will be similarly referred to.

FIG. 3 shows in schematic form the control system of the routing machine. Each solenoid pair 42 and 46 is shown in two parts 42', 42" and 46', 46" respectively causing displacement in the +A, −A, +B and −B directions (considered relative to the coordinate axes A, B). The LVDT sensors 43 and 47 respectively sense solenoid movement in both directions along the B and A axes.

The control system includes an electronic control unit 60 arranged to receive three sets of input signals, these three sets of signals being the P and Q signals from the encoders 50 and 51 over lines 62 and 63; the output signals of the LVDT sensors 43 and 47 over lines 64 and 65; and over lines 67 to 70 four output signals from a magnetic tape recorder 66 (preferably a cassette recorder) having a tape recorded on four tracks identified P, Q, Z and R.

The signals coming from the tracks P, Q, Z are "demand" signals representing the desired displacement of the router 31 in terms of the P and Q coordinate axes, and a Z axis parallel to the axes of the pivot shafts 5 and 22. The signal from track R is a reference signal. The tracks P, Q, Z and R are pre-recorded on the tape during a teaching mode of machine operation to be more fully described below.

The signals from the encoders 50 and 51 are from the LVDT sensors 43 and 47 are "feedback" signals with the encoder signals representing the movement of the mast 40 (and thus of the router 31) on the worktable 1 relative to the machine fixed structure 4 while the signals from the LVDT sensors 43 and 47 are used both as a measure of the velocity and acceleration of the mast 40 over the worktable 1 and as a measure of the displacement of the mast 40 relative to the outer arm 3.

From these three sets of input signals together with the outputs from current sensors arranged to measure the currents in the solenoid pairs 42 and 46, the electronic control circuit 60 is arranged to control energisation of the solenoids 42', 42", 46' and 46" over lines 71 to 74 such as to effect the demanded movement of the router. Since the solenoid pairs 42 and 46 act in directions B and A respectively, the control unit 60 includes a resolver to effect transformation between the P, Q and A, B coordinate axes as will be described below.

As mentioned above, the solenoid pairs 42, 46 are effective only to produce displacement of the router 31 over a limited zone of the worktable 1, the locations of this zone within the worktable area being dependent on the instantaneous positioning of the inner and outer arm parts 2 and 3. In order to prevent the solenoids reaching either end of their range of movement as they seek to effect a demanded movement of the mast 40, the output signals from the LVDT sensors 43 and 47, in addition to being fed to the main electronic control unit 60, are also fed to a control unit 76 over lines 77 and 78 in order to effect appropriate control of the electric motors 14 and 20 adjusting the positions of the first and second parts 2 and 3 of the machine arm. The control unit 76 also receives the output signals from the tachometers 14 and 25. The unit 76 controls the motors 14 and 20 to run when the solenoid pairs 42, 46 move progressively towards either end of their range of movement, the particular end of the range of movement of the solenoids determining the direction of rotation of the motors 14 and 20.

From the foregoing it will be appreciated that the mast 40 and thus the router 31 can be displaced rapidly by the solenoid pairs 42, 46 since the mass of the sub-assembly controlled by these solenoids is small in comparison with the total mass of the system; and the relatively massive arm assembly which provides the rigidity to the machine can be displaced with lower accelerations to carry the sub-assembly over the area of the machine worktable 1. To facilitate this principle of operation, the construction of the machine is such as to make the mass of the sub-assembly carried by the outer part 3 of the arm considerably less than that of the arm itself and arranging for a high response speed of the control system servo loops which control the movement of the mast 40 by the solenoids with respect to the outer arm part 3.

In order to give the required response, the control system comprises three main feedback servo loops, namely:

(i) a first loop controlling movement of the arm parts 2 and 3 such that the solenoids never reach their end stops—the 'demand' signals for this loop are generated by the LVDT sensors 43 and 47 and are processed in the control unit 76;

(ii) a second loop arranged to directly sense movement of the mast 40 and router 31 (by means of the trace wires 48, 49 and encoders 50 and 51) relative to the worktable 1 to cause direct displacement of the mast 40 via the solenoid pairs 42 and 46 upon detection of an error between the actual position of the mast 40 and that demanded by the signals coming from the tape recorder 66;

(iii) a third loop, within the second loop, and arranged to utilize the output signals of the LVDT sensors 43 and 47 to effect high frequency damping of the solenoid movement.

The first servo loop has two cross-coupled channels respectively controlling the arm motors 14 and 20. The second and third loops also include two channels, these being associated with the A and B axes.

Figure 4:
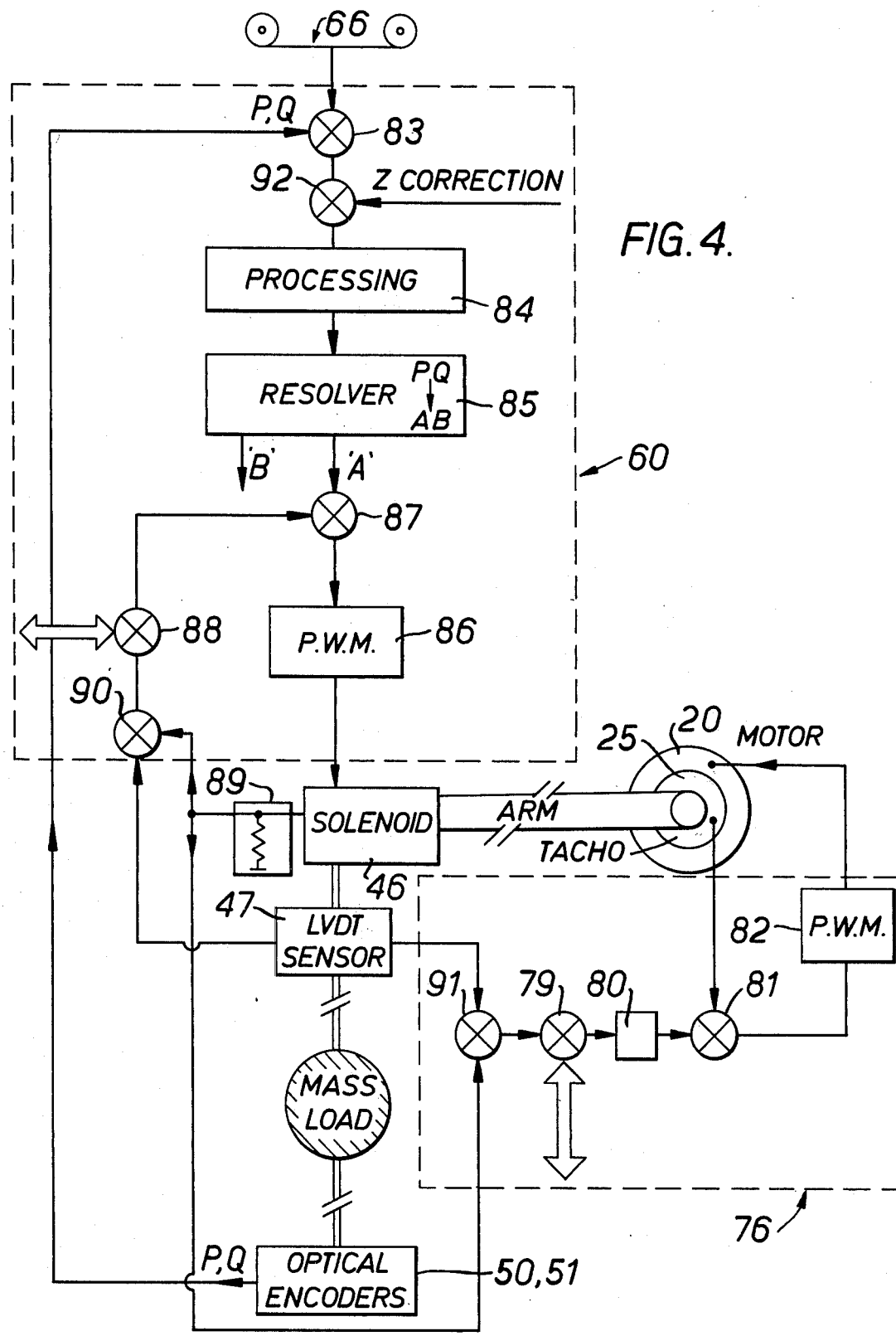
FIG. 4 is a diagram illustrating servo-control loops of the control system.

FIG. 4 schematically shows the first feedback loop in respect of the channel controlling the arm motor 20, and the second and third feedback loops in respect of the 'A' axes channel controlling operation of the solenoid pair 46. Cross-coupling between channels of the servo loops is indicated by broad arrows as will be described hereinafter.

As regards the first loop, providing the motors 14, 20 are capable of operating sufficiently rapidly to ensure that the solenoids never reach their end stops there is no necessity for great accuracy or high response speed. Much of the geometry does not need to be maintained with any high degree of precision as the main elements of the system interact in such a way as to be self-compensating.

Thus for the first loop channel controlling the arm motor 20, signals relating to the displacement (and its derivatives) of the mast 40 relative to the second arm part 3 are received from both LVDT sensors 47 and 43 and are combined in comparator circuit 79, the signals from the LVDT sensor 43 being received as a cross coupled signal (broad arrow) from the first loop channel controlling the arm motor 14. The output from the comparator unit 79 is amplified and processed in unit 80 to generate a 'demand' velocity signal for the motor 20 which is combined in comparator unit 81 with a signal from the tachometer 25 indicative of the actual velocity of the motor 20 (and thus of the relative movement of the arm parts 2 and 3). The output from the unit 81 is fed to a pulse width modulator 82 to produce a variable duty cycle, fixed frequency, energisation signal for the motor 20.

The first loop channel controlling the arm motor 14 is similarly embodied. However, the corresponding unit 80 preferably introduces a variable factor to take into account the changing distance between the axis of arm rotation associated with this motor 14 (that is, the axis of the shaft 5) and the mast 40 (this distance being the effective radius for the rotation effected by the motor 14). The value of this variable factor can be derived by knowledge of the position of the mast 40 relative to the worktable 1 and since this latter information is determined during processing in the control unit 60 (as will be more fully explained hereinafter) it is convenient to provide for appropriate interconnection of the unit 80 and the control unit 60.

The second loop includes a comparator unit 83 arranged to generate P and Q error signals by processing the P and Q demand signals from the tape recorder 66 and the output signals from the optical encoders 50 and 51 which represents the displacement of the mast 40 along the P and Q axes respectively. The resulting error signals then undergo processing in block 84 before passing resultant error signals to a resolver 85 of the sine-cosine type where the signals are resolved from the P,Q axes to the A,B axes. Considering now the A channel signal, this is fed to a pulse width modulator 86 whose output is used to energise the A axes solenoid pair 46.

By varying the ON/OFF ratio of current supplied to the solenoid pair, the average current force applied thereby can be varied. The router 31 can thus be maintained in a stationary position, but with the servo in a dynamic condition, so that an applied load on the router 31 in the plane determined by the movement of the arm parts 2 and 3, will be resisted by the arm servo action, with minimal displacement from its nominal position.

The third loop for the A channel involves the feedback of signals from the LVDT sensor 47 representing the velocity and acceleration of the mast 40 in the A axes direction, these signals being combined into the second loop in a unit 87 interposed between the resolver 85 and the modulator 86. In practice it has been found expedient to provide cross coupling between the third loop channels and this is achieved using a unit 88, the associated broad arrow indicating this cross coupling.

The said third feedback loop using the LVDT sensors is used to introduce into the solenoid control function velocity and acceleration components of the mast 40 because the direct linkage between the LVDT sensor and the mast 40 provides for minimum phase shift at high feedback frequencies thus enabling better control of rapid components of acceleration and/or velocity than could be achieved with the trace wires. This has, electrically, the same effect as a mechanical dashpot, damping out vibrations caused, for example, by successive flutes of a cutter tool striking the workpiece as the tool rotates at high speed. The trace wire system, on the other hand, is subject to compliance and rotational inertia giving rise to high frequency phase shift.

The trace wires and P and Q channels of the second servo-loop provide the main feedback signals so that the cumulative position of the load with respect to the machine bed can be measured irrespective of variations in position of the arm within the range of movement determined by the solenoids. It should be noted that the trace wires could be replaced by other direct measurement means, such as a light beam, for directly measuring the displacement of the mast 40 relative to fixed structure of the machine.

A supplementary feedback loop is also provided to closely monitor the performance of the solenoid pair 46, this monitoring being achieved using a resistor 89 in series with the solenoid pair 46. The output signal from this resistor 88 is combined into the third loop in unit 90 disposed between the LVDT sensor 47 and the unit 88.

The purpose of the supplementary feedback loop is to compensate for the fact that although armature force applied by the solenoid pair 46 is proportional to solenoid current, this is not in general proportional to applied voltage due to the self inductance of the coil and the back E.M.F. generated while the armature is in motion.

Considered more generally, the machine can be seen to have four main prime movers (namely, arm motors 14 and 20, and solenoid pairs 42 and 46) and eight sources of feedback information:

(a) Two optical encoders 50, 51 measuring movement of the mast 40 relative to the machine fixed structure along P and Q axes;

(b) Two LVDT sensors 43, 47 measuring movement of the mast 40 relative to the outer arm part 3 along A and B axes;

(c) Two solenoid current monitors (resistors 89) measuring solenoid forces relative to outer arm part along A and B axes;

(d) Two arm motor tachometers 19 and 25 respectively measuring inner arm angular velocity with respect to the machine fixed structure and outer arm angular velocity with respect to the inner arm.

The described feedback loops serve to combine the feedback signals derived from the above sources (together with time derivatives and integrals of these signals) in a manner to optimise control of the mast 40. In addition to the feedback paths already explicitly mentioned, other paths can be provided where appropriate, for example, the output of the solenoid current monitors can be advantageously supplied to the arm motor control unit 76 to enable this unit to anticipate a requirement to accelerate the motors 14, 20 in a particular direction (the combination of the solenoid current monitor output with the LVDT sensor input to the unit 76 is shown at unit 91 in FIG. 3). The provision of additional feedback paths is to some extent a matter for empirical determination depending on the presence of particular modes of oscillations characteristic of a particular design of arm and tool mount assembly. It may also be expedient to provide further sensors to increase performance, such as current sensors for the motors 14, 20, the output from these sensors being a measure of the torques exerted by the motors.

Control of displacement of the router 31 (and mast 40) in the Z direction is less complicated than the control of movement across the worktable 1, it being generally only required to effect a straightforward raising or lowering operation. Control of Z displacement will therefore not be described in detail. It is worthwhile noting, however, that even though the router 31 is vertically displaced on a parallelogram linkage which will cause a change in its spacing from the outer arm part 3, this will not result in a follow error of the router 31 from its demanded movement since the trace wires 48, 49 sense the movements of the router relative to the machine fixed structure rather than relative to the outer arm part 3. The change of spacing of the router 31 and the arm part 3 will be automatically compensated for by operation of the first servo feedback loop appropriately controlling the arm motors 14 and 20. The use of trace wires 48 and 49 to effect direct measurement between the mast 40 and the machine fixed structure will however result in a slight error being introduced into this measurement upon Z displacement of the mast 40 and router 31, this error being due to the slight change in angle of the plane containing these wires so that the paid out length of the wires no longer truly represents distance over the worktable 1. For this reason Z displacement is accompanied by the feeding of a Z correction into the second servo loop as indicated at unit 92 in FIG. 3.

Various parts of the control system will now be described in somewhat greater detail with reference to FIGS. 5 and 6 which respectively show one of the optical encoders 50, 51, and the main constituent blocks of the tape recorder 66 and of the control unit 60.

Each optical encoder 50, 51 operates to provide pulse signals representing the incremental displacement of the associated trace wire 48, 49 as a doppler frequency modulation of a carrier signal. Each encoder 50, 51 (FIG. 5) comprises an encoder disc 93 bearing around its periphery a plurality of dark lines or marks at a predetermined spacing, for example one quarter of a degree spacing. The disc 90 is carried on a spindle 94 rotatably mounted in a fixed frame structure 95. Rigidly secured to the lower end of the spindle 94 is a drum 96 around which is wound the associated trace wire 48, 49 the other end of which is attached to the mast 40. Between the drum 96 and the fixed structure 95 is wound a spiral clock spring 96 which maintains the trace wire under tension. As the mast 40 is displaced the trace wire is drawn from the drum or allowed to wind back on the drum under the action of the clock spring thereby causing the spindle 94 and with it the encoder disc 93, to rotate about the spindle axis in one direction or the other at a speed-dependent on the speed at which the trace wire is displaced.

Mounted just above the encoder disc 93 is a stationary quadrant 98. Arranged sequentially at, for example, 14° intervals around the periphery of the quadrant and the encoder disc 93 are four optical pick-ups 99. The quadrant 98 carries a plurality of marks substantially parallel to the markings on the encoder disc 93 but the spacing of the stationary marks is slightly different than that of the marks on the encoder disc 93 so that upon rotation of the disc 93 there is a vernier effect which causes visible light and dark fringes by the Moire effect to pass by the four optical pick-ups 99. Such Moire fringes move at a speed dependent on the speed of rotation of the disc 93. The four pick-ups 99 effectively provide samples at 0°, 90°, 180° and 270°, where these represent phase angles of the sinusoidal Moire fringes (see FIG. 5B). The four pick-ups 99 are sampled sequentially and cyclically to give a simulation of rotation of the quadrant 98. In the absence of any movement of the disc 93 the output signals from the optical encoder are in the form of a varying amplitude pulse train of given frequency simulating the effect which would be caused by rotation of the quadrant 98 at a constant speed. When the disc 93 is turned, however, the Moire fringes traverse the pick-ups 99 and the pick-ups provide a pulse train the frequency of the maximum amplitude pulses of which varies in accordance with the speed and direction of rotation of the disc 93. If the disc 93 turns in a direction opposite the sampling direction then the rate of operation of the pulses from the photo detectors is increased, and conversely if it turns in the same direction then the photo detector output pulse rate falls.

The encoders 50, 51 thus output pulse signals representing the incremental displacement of the associated trace wires 48, 49 as doppler frequency modulation of a carrier signal; this doppler signal in conjunction with the sampling frequency of the pick-ups 99 (reference frequency) contains information on the displacement, velocity and acceleration of the router 31 for maintaining the path of the mast 40 in conformity with that set by the 'demand' signal coming from the tape recorder 60. The 'demand' signals are in fact recorded on the tape by putting the tape recorder in a record mode and simply displacing the machine mast 40, either manually or by means of a control system, around the desired path while running the tape recorder to record the P and Q output signals from the encoders 50 and 51 together with the reference frequency used in the encoders and any further information required (such as Z displacement). The recording of the encoder reference frequency enables the recovery of the frequency deviation of the P and Q signals while compensating for any fluctuations in tape speed during play back.

The use of doppler frequency modulation and incremental encoding enable considerable reductions in data rates to be achieved by digital pre-processing before the signals from the optical encoders 50, 51 and from the tape recorder 66 are processed in a microprocessor of the control unit 60 (to be described hereinafter).

It will be appreciated that during operation of the machine, the processing by the control unit 60 of the demand and feedback P and Q signals from the encoders 50, 51 and from the tape recorder 66 will involve the integration of these signals in order to derive positional information. There is thus some risk of "losing count" due to dust on the tape head, magnetic "gaps" in the tape for example due to splicing or dust on the optical disc. In order to overcome this, it is advisable to adopt the following measures. First the "optical window" of each pick-up 97 should be made sufficiently wide to view several marks simultaneously so that a limited accumulation of dust or scratches will not affect a mainly dark or light reading. Secondly, the sampling rate of the pick-ups 97 (12 KHz) is selected such that it is well above the greatest change (about 4 KHz) which can be introduced when the drum 96 is turned at its fastest rate. In addition, the signal from the opposite pairs of photo detectors, which are 180° out of phase with one another, are subtracted in order further to increase the tolerance to defects, and to improve the accuracy. At the same time, by subtracting the background illumination the effects of variations in the mean density are greatly reduced.

To further reduce the possibility of spurious signals on the P and Q channels, electronic "flywheels" are provided in the outputs of the encoders 50, 51 and in the read circuits of the tape recorder 66. These electronic flywheels accommodate the loss of several counts and help to eliminate "noise". The flywheels make use of the fact that the frequency of the incoming data is changing relatively slowly (due to the inertia of the mechanism). The incoming data is used to drive an electronic flywheel built around a phase locked loop whose frequency is allowed to change relatively slowly in correspondence to the maximum expected data rate. The input signal for the electronic control unit 60 are derived from this "flywheel" device which effectively makes up any lost counts and eliminates any higher frequency noise.

Figure 6:
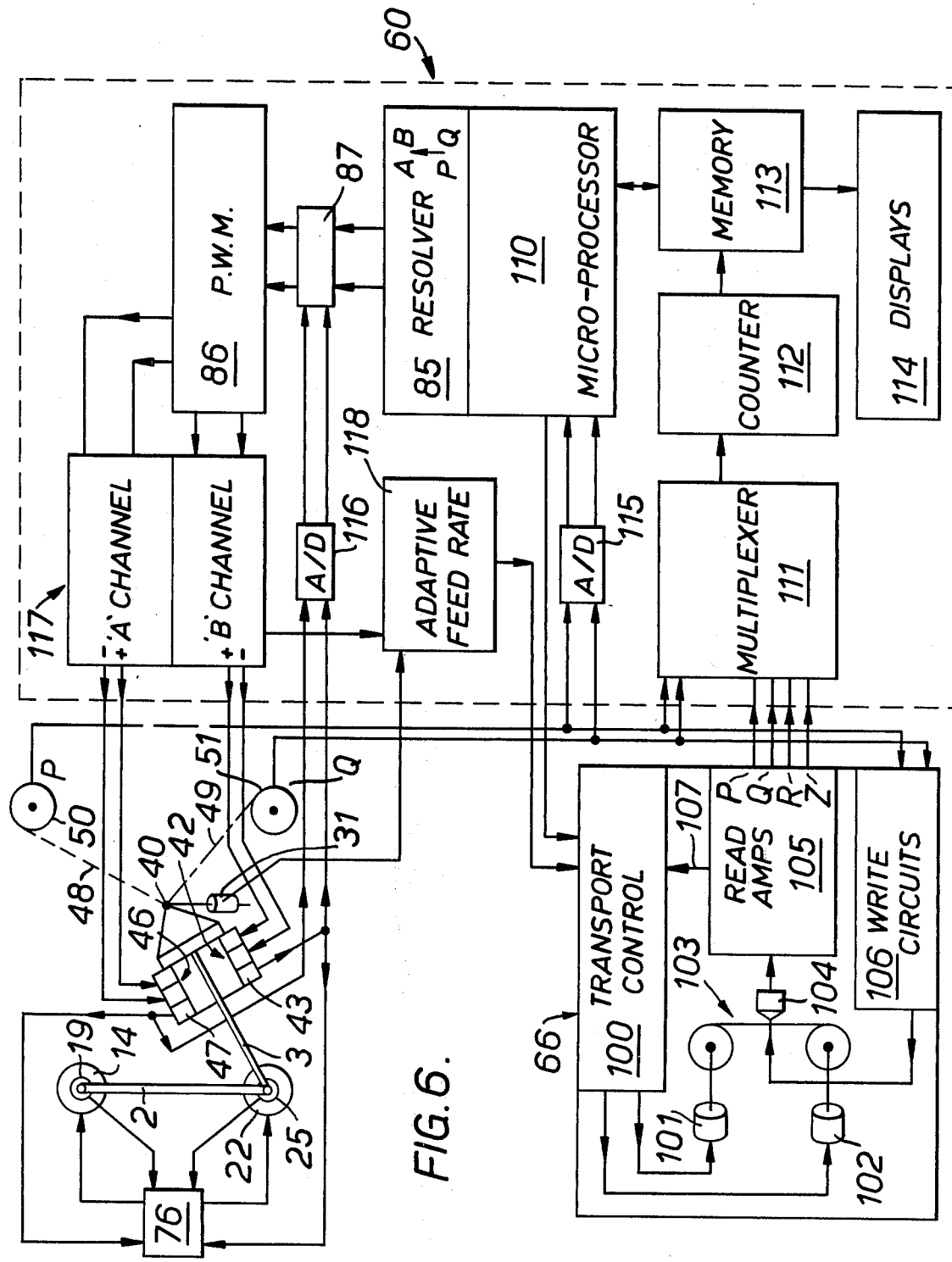
FIG. 6 is a block diagram illustrating the main functional blocks of an electronic control unit of the control system.

Referring now to FIG. 6, the tape recorder 66 incorporates tape transport control circuit 100, controlling the operation of two drive motors 101, 102 for transporting magnetic tape, in a cassette generally indicated by arrow 103, past a magnetic read/write head 104 the output of which is fed to a read amplifier circuit block 105 and which can be fed from a write circuit 106. The outputs from the read amplifier circuit 105 are fed to the electronic control unit 60 and also a feedback loop 107 is taken to the tape transport control block 100 so that instructions written on the magnetic tape itself can be used to control the operation of the tape recorder 66, for example for fast forward or for fast rewind.

The control unit 60 receives a variety of pulse signals on different lines and a microprocessor 110 is used to process these signals to derive the required correction signals for feeding to the solenoid pairs 42 and 46. However, the data rates of the incoming signals are too high to be input directly into the microprocessor 110. Due to the format of the incoming data, pre-processing can be readily carried out in digital hardware to achieve a data rate that can be handled by the microprocessor 110. As has already been mentioned, incoming data from the tape recorder 66 and encoders 50, 51 is in the form of a pulse train with frequency deviation proportional to velocity and with the integral of the frequency deviation equal to displacement. Since both the tape recorder 66 and the encoders 50, 51 have respective associated reference signals corresponding in frequency to the undeviated carrier of the f.m. signal, the desired integrals can be obtained by counting in an up-down counter, the deviated signal causing the counter to count up, and the reference frequency subtracted by counting down. The contents of the counter then representing displacement from an origin.

If the data is from one of the optical encoders 50, 51 then after subtracting the optical encoder reference frequency the difference is the feedback position of the router 31. If the data signal is from the tape recorder 66 then after subtracting the tape reference frequency (track R) the difference is the demand position. Providing therefore that the scaling is correct an up-down counter can be used to subtract the feedback position from the demand position, providing a difference or error signal to be subsequently used in controlling the machine. To generate the required control function, the microprocessor 110 requires information on a number of parameters (for example, displacement along both the P and Q axes) all of which could be obtained by differential counting in up-down counters. However in order to reduce hardware complexity the data inputs to the unit 60 are time multiplexed by a multiplexer 111 with each of the required parameters being derived in turn from the data inputs in a single up-down counter 112. The required parameters are thus derived in digital hardware external to the microprocessor 110 it being noted that although this preprocessing is digital in character it is not effected in a binary or other numeric code but is simply a counting process. Under the control of the microprocessor 110, the derived parameters placed in binary form in a main memory 113 which is interrogated as required by the microprocessor 110. The memory 114 also feeds displays 115.

Although it would be possible to derive P and Q velocity errors using a counting technique similar to that described it is preferred for reasons of speed to provide this information by measurement of the periods of the P, Q signals, this being effected in an analogue/-digital converter 115 under the control of the microprocessor 110.

Using the values of parameters fed thereto, the microprocessor implements the required control function (block 84 in FIG. 3) to derive digital correction signals referred to the P,Q axes. These signals next require to be resolved into the axes A, B of the solenoid pairs 42, 46. Although shown outside the microprocessor unit 110 the resolver 85 is in practice a software calculation within the microprocessor 110 of the sine/cosine type. However, it will be appreciated that the coefficients of the terms have to vary as the mast 40 and router 31 move to different positions across the table 1 since this movement also changes the orientation, both mutual and relative to the table, of the axes P and Q. The position of the mast 40 is therefore defined as within one of a plurality of zones over a range of values of the displacement along the P and Q axis. For simplicity, it is possible to use a single set of coefficients for resolution to cover a finite area of the machine bed defined by a finite range of values of the P and Q coordinates, rather than individual coefficients for each notional point on the machine bed. In this way the electronics can be simplified and a memory serving as a look-up table of coefficients can be utilised, the address for the information being defined by the range of P and Q coordinate values, these values obtained by the microprocessor 100 during its operation. Such a zoning of the worktable 1 is illustrated in FIG. 7 where 202 zones are shown, identified by the hexa-decimal alpha-numeric set 0-F from a nominal zero origin of each trace wire 48, 49. The mast 40 is shown positioned in zone P-D, Q-4. The look up table can also be used to store other zone coefficients such as the variable factor fed to the unit 80 of the inner arm channel of the first servo loop.

The output from the resolver 85 is then combined in unit 87 with the LVDT sensor outputs, the latter having been converted into digital form in an analogue to digital converter 116. The output of the unit 85 passes via the pulse width modulator 86 to amplifiers 117 feeding the solenoid pairs 42, 46.

The microprocessor 110 as well as actually calculating the required correction signals for energising the solenoids, also effects a general controlling function over the elements of the control unit 60.

Although control of movement in the Z direction has not been described in detail, it will be appreciated that because the Z movement is generally slow and intermittent, the demand and feedback signals can be simpler in form than for the P,Q channels.

It will also be appreciated that by playing back the tape at a speed different from that at which it was running when the recording of the path is made, the speed at which the machine operates can be readily varied; and indeed the ability readily to vary the speed in dependence on, for example, information concerning material cutting efficiency (e.g. temperature, motor torque and speed, vibration, noise etc.) permits relatively simple adaptive control in order to optimise the cutting process. The setter can record the programme at a conveniently lower speed conductive to human ergonomics and accuracy. Playback speed can be varied manually or by servo-controlling the tape drive motor with reference to criteria for optimising cutting speed and/or accuracy and smoothness. Thus in FIG. 6 there is shown an adaptive feed rate unit 118 arranged to receive as inputs signals indicative of the router current and the solenoid currents, these being a measure of cutting resistance. The unit 118 has an output connected to the transport control unit 100 to effect appropriate variation in tape speed.

The possibility of control in the Z direction enables the router 31 to be raised and lowered as required to cut slots as well as continuous outlines. Furthermore, the machine can be readily adapted for use with a drill rather than a router in which case displacement along the P,Q coordinate axes takes place with the drill raised, and Z movement occurs intermittently when the drill is positioned as required over the workpiece.

The machine can also be used with other power tools such as a jig saw which require a fourth degree of freedom, that is yaw. The further adjustment mechanisms required will be well within the comprehension of those skilled in the art and the Z track of the tape can be used for the yaw data due to the low data rate of both of these signals. Other signals may also be recorded via the Z track in digital binary form providing the machine operator with information regarding workpiece, part number, and tool size and diameter.

Owing to the direct sensing and positioning of the machine head provided by the mast 40, the second and third feedback loops and the solenoids 42 and 46, the described machine is particularly useful for controlling movement of a power cutting tool (such as any milling tool) in which a lateral reaction force is generated between the tool and workpiece. However, as already indicated, the machine has wider applications such as for controlling movement of drills, flame cutters and gripping tools.

Instead of generating the 'demand' signals by playing through the pre-recorded tape each time it is required to effect a particular sequence of tool movements, after the recording of the tape during the teaching mode of machine operation the tape can be used to program a computer type memory with the demand signal information, one suitable type of memory being the magnetic bubble memory. In this manner repetition of a particular sequence of tool movement is effected by successive scans of the memory.

We claim:

1. An automatic machine for effecting required movements of an element over a two-dimensional work area, said machine comprising:

fixed structure, first support means in the form of a cantilevered arm having inner and outer arm parts respectively articulated to said fixed structure and to said inner arm part, second support means mounting said element and carried at the free end of said outer arm part in a manner permitting relative movement between said second support means and the outer arm part within predetermined displacement limits whereby to enable the said element to be moved over a zone of the work area, the location of said zone within the work area being dependent on the instantaneous position of the first support means, a first servo control loop including first movement means in the form of respective motors for articulating the inner and outer arm parts whereby to enable the second support means and the said element to be displaced over substantially the whole of the work area; first sensing means arranged to generate output signals indicative of the approach of the second support means to a said limit of its displacement relative to the said outer arm part; and first control means for controlling operation of said first movement means in dependence on the output signals of said first sensing means; and a second servo control loop including second movement means in the form of two linear actuators operative to move the second support means relative to the outer arm part in respective mutually orthogonal directions, the said two linear actuators being arranged such that their respective lines of action are substantially parallel to each other, and the second movement means further including a linkage system effective to transpose the action of the said actuators from their lines of action to said mutually orthogonal directions; second sensing means arranged to generate feedback signals indicative of movement of the said element over the work area relative to the machine fixed structure; storage means for storing demand signals indicative of the required movement of the element relative to said fixed structure; and second control means arranged to receive said feedback and demand signals and being operative in dependence thereon to control the second movement means with a view to causing the latter to effect the said required movement by itself notwithstanding the said limits on the permitted relative movement between the outer arm part and the second support means;

said first servo control loop being responsive to the second support means approaching a said limit of its displacement relative to the outer arm part, to so move the first support means relative to the fixed structure as to contribute to the said required movement of said element sufficiently to prevent the second servo control loop seeking to move the second support means beyond the relevant said displacement limit.

2. An automatic machine according to claim 1, wherein the said second sensing means includes two encoders mounted in spaced relation on said fixed structure, and two trace wires extending between respective said encoders and a point moving with said element.

3. An automatic machine according to claim 1 or 2, in which said linkage system includes:

a first member pivotally connected to the linear actuators by respective parallel pivots the axes of which are substantially perpendicular to the line of action of the actuators, said second support means being carried on said first member at a position spaced from said pivot axes; and a second member pivotally connected at one end to the said outer arm part and at the other end to one of the pivots forming the pivotal connection between said first member and the associated linear actuator.

4. An automatic machine for effecting required movements of an element over a two-dimensional work area, said machine comprising:

fixed structure, first support means carried by said fixed structure for movement relative thereto over said work area;

second support means mounting said element and carried by said first support means in a manner permitting relative movement between said first and second support means within predetermined displacement limits, whereby to enable the said element to be moved over a zone of the work area, the location of said zone within the work area being dependent on the instantaneous position of the first support means, a first servo control loop including first movement means for moving the first support means relative to the fixed structure whereby to enable the second support means and the said element to be displaced over substantially the whole of the work area; first sensing means arranged to generate output signals indicative of the approach of the second support means to a said limit of its displacement relative to the first support means; and first control means for controlling operation of said first movement means in dependence on the output signals of said first sensing means; and a second servo control loop including second movement means for effecting relative movement of the first and second support means; second sensing means arranged to generate feedback signals indicative of movement of the said element over the work area relative to the machine fixed structure, said second sensing means including an arrangement for intercommunicating the machine fixed structure and a point moving with said element by means distinct both from the first and second support means and from the first and second movement means; storage means for storing demand signals indicative of the required movement of the element relative to said fixed structure; and second control means arranged to receive said feedback and demand signals and being operative in dependence thereon to control the second movement means with a view to causing the latter to effect the said required movement by itself notwithstanding the said displacement limits on the permitted relative movement between the first and second support means;

said first servo control loop being responsive to the second support means approaching a said limit of its displacement relative to the first support means, to so move the first support means relative to said fixed structure as to contribute to the said required movement of said element sufficiently to prevent the second servo control loop seeking to move the second support means beyond the relevant displacement limit.

5. An automatic machine according to claim 4, wherein said second sensing means includes two encoders mounted in spaced relation on said fixed structure and two trace wires extending between respective said encoders and said point moving with the element, said wires defining two coordinate axes of measurement.

6. An automatic machine according to claim 5, wherein said second movement means comprises two linear actuators arranged between said first and second support means and operative to move said second support means in respective directions approximately mutually orthogonal, said second control means including resolver means for translating between said two coordinate axes of measurement and said two directions of movement associated with the linear actuators.

7. An automatic machine according to claim 6, wherein said linear actuators are solenoids and said first sensing means comprise respective linear variable differential transformers associated with each linear actuator.

8. An automatic machine according to claim 4, wherein the feedback signals generated by said second sensing means take the form of a frequency modulated carrier signal the frequency deviation being dependent on the velocity of said element over the work area.

9. An automatic machine according to claim 5, wherein each said encoder is a rotary optical encoder having a circular grating arranged to be rotated in correspondence to variations in the distance between the encoder and said point moving with said element as measured by the trace wire, the encoder further including a fixed grating positioned to generate Moire fringes with the circular grating, and a plurality of optical pick-ups spaced to detect different phases of said fringes, said pick-ups being sampled at a fixed reference frequency to simulate relative rotation of the gratings whereby to output a signal of fixed frequency in the absence of rotation of said circular grating, rotation of the circular grating causing a variation in frequency of the output frequency dependent on the velocity of said element in the coordinate direction defined by the trace wire associated with the encoder.

10. An automatic machine according to claim 4, wherein said demand signals are pre-recorded on magnetic tape which is played back during operation of the machine to control movement of said element over the work area in a predetermined manner.

11. An automatic machine according to claim 4, wherein said first support means is a cantilevered arm having inner and outer arm parts respectively articulated to said fixed structure and to said inner arm part, the second support means being carried at the free end of said outer arm part, and said first movement means comprising respective motors for articulating the inner and outer arm parts.

12. An automatic machine according to claim 11, wherein said element is a shaping tool which during operation is subject to substantial cutting reaction forces in the plane of movement of the tool movement across the work area.

13. An automatic machine according to claim 4, including third movement means with associated control means operative to control movement of said second support means towards and away from said work area in a direction substantially perpendicular thereto.

14. An automatic machine according to claim 4, wherein said demand signals are generated from data held in an electronic memory constituting said storage means.

15. An automatic machine according to claim 14, wherein said data is entered into said memory off a magnetic tape onto which the data is recorded during a teaching mode of machine operation.

* * * * *